United States Patent Office 3,228,780
Patented Jan. 11, 1966

3,228,780
HIGH MOLECULAR ORGANIC PRODUCTS
COLORED WITH A PIGMENT DYESTUFF
Maurice Grelat, Bettingen, Switzerland, assignor to Ciba Limited, Basel, Switzerland, a Swiss company
No Drawing. Filed Sept. 23, 1963, Ser. No. 310,850
Claims priority, application Switzerland, Nov. 14, 1958, 66,166/58; Sept. 23, 1959, 78,552/59
16 Claims. (Cl. 106—193)

This application is a continuation in part of my application Ser. No. 848,516, filed October 26, 1959 (abandoned since the filing of the present application).

The present invention is based on the observation that 4:4'-diamino-1:1'-dianthraquinonyl of the formula

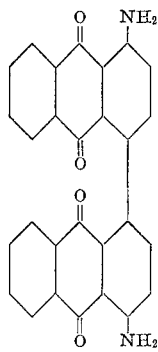

is eminently suitable for coloring high molecular organic products in the mass.

When the pigment to be used in the process of this invention is not already in a finely divided form and/or in the modification that is especially suitable for its use, it is desirable that the pigment should be subjected before use to a conditioning treatment, for example, by reprecipitation of the dyestuff from concentrated sulfuric acid, or grinding in the dry or wet condition, advantageously in the presence of an organic water-soluble or water-insoluble solvent, or by kneading or grinding the crude pigment in the presence of a solid assistant, for example, a salt capable of being removed by washing. Conditioning can also be brought about by heating the crude pigment in water at a temperature above 100° C. and under pressure. Good results can also be obtained by combining various treatments, for example, swelling the crude pigment in sulfuric acid and then treating it with an organic solvent. In many cases it is of advantage, in order to convert the pigment into a finely divided form, to grind the crude pigment with the substratum to be colored or with a component of the substratum. The transference of the pigment from the aqueous medium into an organic substratum can also be carried out by the so-called "Flush" process.

As high molecular materials that may be colored by the process of the invention there may be mentioned for example natural high molecular products, such as abietic acid, rubber, casein or cellulose or cellulose derivatives such as nitrocellulose, cellulose acetate, cellulose propionate, cellulose acetopropionate, cellulose acetobutyrate or carboxymethyl cellulose, and especially synthetic high molecular products, for example polymerization resins, such as vinyl polymers which are obtained by polymerizing ethylene or a monovinyl compound that is a compound which is derived from ethylene by substitution of one or both hydrogen atoms on one of the two carbon atoms of the ethylene for example by halogen atoms, alkyl, phenyl or cyano groups. As examples may be mentioned polyolefines, such as polyethylene, polypropylene, polyisobutylene, polybutadiene, polyisoprene, polystyrene or polyvinylhalides, such as polyvinylchloride or poly-(1,2-dichlorethylene) or polyvinylcyanides such as polyacrylonitrile, poly - (1,2 - dicyanethylene) polymethacrylonitrile, polymethacrylic acid ester, furthermore polyacrylic acid esters, polyvinylacetate and polyvinylacetal. Instead of the homopolymers, also the copolymers of different monovinyl compounds must be mentioned, for example the copolymers of vinylchloride with vinylacetate or of vinylchloride with 1,2-dichloroethylene or of acrylonitrile with 1,2-dicyanethylene or of butadiene with styrene. Here also the polymerization products of natural unsaturated compounds such as linseed oil must be mentioned.

The pigment to be used according to the present invention are also highly suitable in the manufacture of colored condensation resins especially aminoplasts which are obtained by reacting urea or a compound of urea like character, such as thiourea, guanidine, acetylene diurea, dicyandiamide or uron. As further compounds with urea-like character the aminotriazines, especially melamine or guanamines, such as aceto-, benzo- or formoguanamine must be mentioned. The pigment is advantageously incorporated into the low molecular condensation products of above mentioned amino compounds with formaldehyde, for example di-, tri- or tetramethylol urea, tri- or hexamethylol melamine. In place of the free methylol compounds also their ethers with low molecular aliphatic alcohols, such as methanol or butanol may be used. The pigment is equally useful for the manufacture of colored molded articles or colored lacquers that contain one or several of the above aminoplasts in an organic solvent or colored aqueous emulsions containing the above precondensates, if necessary in the presence of organic solvents for example an oil-in-water emulsion or a water-in-oil emulsion. Such emulsions are especially suitable for impregnating or printing textiles or other sheet-like structures, such as paper or leather or fabrics made of glass fibers with subsequent heat treatment. Another important type of polycondensation resins to which the 4,4'-diaminodianthraquinonyl can be applied are the polyester resins, which are obtained when an unsaturated polyester is reacted with an unsaturated polymerizable compound such as cyclopentadiene, cyclohexene, vinyl acetate, methyl methacrylate or especially styrene. The unsaturated polyesters are obtained by the polycondensation of an unsaturated polycarboxylic acid, such as maleic acid, fumaric acid, itaconic acid or their anhydrides with a polyhydric alcohol, such as ethylene glycol or polyethylene glycols. As further types of polycondensation resins there must be mentioned the linear polyesters which are obtained by the polycondensation of an aromatic dicarboxylic acid, especially terephthalic acid with an aliphatic diol, especially glycol, or the linear polyamides, which are obtained by the polycondensation of an aliphatic dicarboxylic acid with an aliphatic diamine or by the condensation of an ω-amino-fatty acid, especially ε-caprolactam or ω-aminoundecanoic acid. Both the linear polyamides and polyesters are primarily used for making fibers. For this purpose the pigment is dispersed in the melt of the polycondensates, and the pigmented melt is extruded to form fibers. Finally, also the polycarbonates must be mentioned which are obtained by the polycondensation of a dihydroxy compound for example 4,4-dihydroxy-2,2-propane with phosgene.

With the same success the 4,4'-diamino-dianthraquinonyl can also be used for the manufacture of colored polyaddition resins for example polyurethane resins which are obtained by the polyaddition of a polyhydric alcohol, with a polyisocyanate; as polyols there come into consideration, for example ethylene glycol, 1,3- or 1,4-butylene glycol, trimethylolpropane, hexantriol-1,2,6, diethylene glycol or a hydroxy group containing high molecular polyether or polyester, especially a polyester from dicarboxylic acids, such as adipic acid, maleic acid, or phathalic acid with one of the above mentioned glycols. As polyisocyanates especially the arylene diisocyanates, such as naphthylene-1,5-diisocyanate, diphenylmethane-diisocyanate, phenylene-1,4-diisocyanate, 1-methyl-phenylene-2,4-diisocyanate, or m- or p-xylylenediisocyanate must be mentioned. There may be formed coatings, molded articles or foams on the basis of colored polyurethanes. Also a very important class of polyaddition resins are the epoxy resins which are obtained by polyaddition of a condensate which is obtained by condensing in an alkaline medium epichlorohydrin or dichlorohydrin and one or more polyhydric alcohols or phenols, for example resorcin, hydroquinone, 4,4'-dihydroxybenzophenone, bis-(4-hydroxyphenyl)-1,1-ethane, bis-(4-hydroxyphenyl)-1,1-isobutane or bis-(4-hydroxyphenyl)-2,2-butane, bis-(4-hydroxyphenyl)-1,1-cyclohexane or especially bis-(4-hydroxyphenyl)-2,2-propane. When these condensates are colored with the 4,4'-diamino-1,1'-dianthraquinonyl and cured in the presence of catalysts, such as amines, very stable colored resins are obtained.

Since the 4,4'-diamino-1,1'dianthraquinonyl is insoluble in all organic solvents and heat resistant to a high degree it is equally suitable for coloring lacquers or spinnable masses dissolved in solvents or molten spinnable masses.

The 4,4'-diamino-1,1'-dianthraquinonyl is, when synthesized, in a physically useful form, and is advantageously finely dispersed before application, for example by being ground in a dry or moist aqueous state with or without the addition of an organic solvent and/or a salt which can be washed out.

The 4,4'-diamino-1,1'-dianthraquinonyl can be used either in the pure form as a so-called toner or in the form of preparations in which the pigment is present in a finely divided state, especially with a particle diameter of not more than 3μ, advantageously not more than 1μ. Such preparations, which may contain the usual additions, for example, dispersing agents or binders, can be produced in known manner by an intense mechanical treatment, for example, on a roller mill or in a suitable kneading apparatus. The dispersing medium in which they are subjected to the intensive mechanical treatment is chosen to suit the preparation to be made, for example, sulfite cellulose waste liquor or salts of dinaphthylmethane disulfonic acid are used for the manufacture of preparations that are to be dispersible in water, and acetylcellulose mixed with a little solvent is used for the production of compositions for spinning cellulose acetate rayon.

By virtue of its chemical inertness and good heat resistance, the pigment can easily be dispersed in the usual manner in the aforesaid masses and preparations, and this is advantageously carried out at a stage before the said masses and preparations have reached their final form. The operation required for giving the products their final form, as, for example, spinning, pressing, hardening, casting and cementing can easily be carried out in the presence of the pigment without interfering with any chemical reactions of the substratum, such as further polymerization, condensation or polyaddition.

The colorations obtained with the 4,4'-diamino-1,1'-dianthraquinonyl are distinguished by their excellent fastness to light and heat and excellent fastness to migration.

The following examples illustrate the invention. Unless otherwise stated, the parts and percentages are by weight.

*Example 1*

5 parts of 4,4'-diamino-1,1'-dianthraquinonyl are mixed with 95 parts of dioctylphthalate, and the mixture is ground in a ball mill until the dyestuff particles are smaller than 3 microns.

0.8 part of the resulting dioctyl phthalate paste are mixed with 30 parts of polyvinyl chloride, 7 parts of dioctyl phthalate, 0.1 part of cadmium stearate and 1 part of titanium dioxide, and the mixture is then rolled for 5 minutes on a two-roller mill at 140° C. There is obtained a brilliant red coloration of very good fastness to light and migration.

In order to test the fastness to migration a colored foil prepared from the colored polyvinyl chloride was covered with a white foil, and the two foils were heated at 80° C. under a pressure of 1000 grams per square centimeter for 24 hours.

*Example 2*

40 parts of a nitrocellulose lacquer, 2.375 parts of titanium dioxide and 0.125 part of 4,4'-diamino-1,1'-dianthraquinonyl are ground together in a rod mill for 16 hours. The lacquer so obtained is brushed in a thin layer on an aluminum foil. There is obtained a red lacquer coating having very good properties of fastness.

*Example 3*

A mixture of 25 parts of 4,4'-diamino-1,1'-dianthraquinonyl, 25 parts of acetyl-cellulose (54.5% of acetyl groups), 100 parts of sodium chloride and 50 parts of diacetone-alcohol is treated in a kneading machine, while cooling, until the pigment has reached the desired degree of fineness. There are then added 25 parts of water and kneading is continued until a finely granular mass is obtained. The mass is placed on a suction filter and the sodium chloride and diacetone-alcohol are completely removed by washing with water. The residue is dried in a vacuum cabinet at 85° C. and ground in a hammer mill.

To a cellulose acetate silk spinning composition consisting of 100 parts of acetyl-cellulose and 376 parts of acetone are added 1.33 parts of the pigment preparation obtained as described above. The whole is stirred for 3 hours, which suffices to bring about complete dispersion of the dyestuff. Filaments produced from the resulting mass in the usual manner by the dry spinning process have a red coloration which has very good properties of fastness.

*Example 4*

0.25 part of 4,4'-diamino-1,1'-dianthraquinonyl are ground in a rod mill for 24 hours with 40 parts of an alkyd-melamine bakeable lacquer having a solids content of 50%, and 4.75 parts of titanium dioxide. The lacquer so obtained is brushed in a thin layer on an aluminum foil and the coating is baked for one hour at 120° C. There is obtained a red lacquer coating having an excellent fastness to light.

*Example 5*

4.8 parts of 4,4'-diamino-1,1'-dianthraquinonyl are ground in a ball mill with 4.8 parts of the sodium salt of 1,1'-dinaphthylmethane-2,2'-disulfonic acid and 22.1 parts of water until all the dyestuff particles are smaller than one micron. The pigment suspension so obtained has a pigment content of about 15%.

By adding the aqueous suspension to a viscose spinning composition there are obtained by the usual spinning process red colored cellulose filaments having very good properties of fastness.

*Example 6*

A dyebath is prepared which contains in 1000 parts of water 15 parts of a latex of a copolymer of 85.8 parts of isobutylacrylate, 9.6 parts of acrylonitrile and 4.6 parts of acrylic acid,
15 parts of an emulsion of 70% strength of a methylolmelamine allyl ether modified with soya bean fatty acid and emulsified with Turkey red oil,
50 parts of a water-soluble methyl ether of a urea-formaldehyde condensation product in which more than 2 mols of formaldehyde have been condensed per mol of urea,
5 parts of the pigment suspension obtained as described in the first paragraph of Example 5, and
20 parts of formic acid of 10% strength.

A cotton fabric is immersed at room temperature in the dry state in the above dyebath, the fabric is then squeezed on a foulard to a wet increase of 65–80%, dried in the normal manner, if desired under tension (by means of clamps or on a needle frame) and then subjected to hardening treatment for 5 minutes at 145–150° C.

There is obtained a red coloration which is distinguished by excellent properties of fastness, especially its fastness to light.

*Example 7*

24 parts of 4,4'-diamino-1,1'-dianthraquinonyl are kneaded in a kneading machine with 10 parts of a condensation product of 1 mol of 2,6-ditertiary butylparacresol and 15 mols of ethylene oxide, 31 parts of water are added, and the dyestuff paste is homogenized on a roller mill.

There is added, while stirring cautiously, a resin lacquer emulsion, consisting of 7 parts of water and 28 parts of a preparation obtained in the manner described below. There are obtained 100 parts of a mobile dyestuff paste which is well dispersed and is very suitable in combination with an aqueous binding agent for use in textile printing.

The preparation mentioned above may be prepared as follows:

800 parts of a solution of about 70% strength of a butanol-modified melamine-formaldehyde condensate in butanol are emulsified in an aqueous solution containing 620.4 parts of water, 80 parts of purified lactalbumen-free acid casein, 64 parts of urea, 16 parts of thiourea, and 9.6 parts of borax. To the moderately thickly liquid finely dispersed emulsion are added 10 parts of an aqueous solution of ammonia of about 25% strength in order to convert into hexamethylene tetramine the 0.82% of free formaldehyde present in the resin solution, which passes into the aqueous phase during the emulsification. After diluting the emulsion with a further 377 parts of water it is subjected to distillation under reduced pressure in an apparatus working on the circulation principle, whereby about 500 parts of water and about 170 parts of butanol are distilled off. There are obtained about 1310 parts of a stable salve-like preparation which, after dilution with an equal quantity of water, has a pH value of 7.7. 1000 parts of the diluted emulsion, after being mixed with 100 parts of an aqueous solution of ammonium thiocyanate of 50% strength, yield a binding agent composition which can be excellently hardened at a raised temperature.

By the distillation the solvent content of the resin phase is reduced from about 30% to about 10%, and at the same time the total dry content of the emulsion is raised from about 45% to about 55%.

*Example 8*

For making a laminated material the following individual sheets are prepared:

(a) Strong paper of unbleached sulfate cellulose (so-called kraft paper) is impregnated with an aqueous solution of phenol-formaldehyde resin, and then pressed and dried.

(b) Paper of pure chemically bleached cellulose containing zinc sulfide or titanium dioxide as filling material is impregnated with an aqueous solution of 50% strength of dimethylol-melamine, and is then pressed and dried at 100° C.

(c) 400 parts of a decoration paper of bleached cellulose containing zinc sulfide or titanium dioxide as filling material are disintegrated in a hollander with 10,000 parts of water. To the paper mass so obtained are added 30 parts of the pigment suspension obtained as described in Example 5. The pigment is fixed by the addition of 16 parts of aluminum sulfate. The colored decoration paper is impregnated with an aqueous solution of 50% strength of dimethylol-melamine, and is then pressed and dried at 100° C.

(d) Depending on the quality of the laminated material the decoration paper is protected with a silk paper of bleached special cellulose, which weighs 40 grams per square meter. The silk paper is also impregnated with an aqueous solution of 50% strength of dimethylol-melamine, and then pressed and dried at 100° C.

Pieces of the sheets so prepared having the same size, for example, 2.75 meters by 1.25 meters, are placed one upon another as follows:

Upon 3 to 5 sheets of paper (a) are laid one sheet of paper (b), one sheet of paper (c) and, if desired, one sheet of paper (d), and the whole assembly is pressed between highly polished chromium plated plates for 12 minutes at 140–150° C. under a pressure of 100 kilograms per square centimeter. The assembly is then cooled to 30° C. and the resulting laminated material is removed from the press. The material has on one side a red coloration which has an excellent fastness to light.

*Example 9*

99 parts of a polyamide of ω-aminoundecanoic acid are "bread-crumbed" in the form of chippings with 1 part of very finely divided 4:4'-diamino-1:1'-di-anthraquinonyl. The "bread-crumbed" chippings are spun in the usual manner, for example, by the grid spinning method, at 240° C. There are obtained red colored polyamide filaments having good properties of fastness.

*Example 10*

A mixture consisting of 50 parts of the 4,4'-diamino-1,1'-dianthraquinonyl, 100 parts of Staybelite Ester 10 (glycerine ester of hydrogenated colophony), 200 parts of sodium chloride and 18 parts of diacetone alcohol is treated in a kneading apparatus with cooling until the pigment is of the degree of fineness required. The sodium chloride and diacetone alcohol are then removed from the dough so obtained by the introduction of water at 80° C., in which process the dough itself is unaffected. The dough, now free from salt and solvent, is completely dried by heating the kneading apparatus with steam and, when cold, it is pulverized in the kneading apparatus.

The preparation so obtained can be used, for example, for coloring lacquers. To this end it is advantageously pasted with a little toluene and the paste so obtained is stirred together with the lacquer.

*Example 11*

150 parts of the dry pigment described in Example 1 together with 300 parts of a casein solution of 20% strength, 40 parts of a dispersing agent and 250 parts of distilled water are ground in a suitable apparatus until most of the pigment particles are less than 1μ in size. The pigment paste so obtained is stirred together with 50 parts of a wax emulsion of 30% strength and a further 200 parts of a casein solution of 20% strength and there is so obtained a homogeneous pigment paste containing 15% of pigment. 50 parts of this pigment paste containing 15% of pigment are well mixed with 100 parts of a casein solution of 20% strength, 5 parts of sodium sulforicinoleate, 50 parts of an egg albumin solution of 10% strength and 870 parts of distilled water.

This pigment dispersion, which is ready for use, is applied in one or two coats to pre-dyed full chrome grain leather by means of a plush pad or a hair brush. A levelling coat of the same pigment solution is then sprayed on at a pressure of 4 to 5 atmospheres. A casein solution of 20% strength is then applied in the same manner, given a short drying, and is then hardened with a formaldehyde solution of 8 to 10% strength. The pigment application is concluded by subjecting the surface of the leather to mechanical glazing and hydraulic pressing at 60 to 80° C. and a pressure of 150 to 200 atmospheres. The dyeing exhibits good fastness to light, excellent fastness to wet rubbing and a high degree of transparency.

Example 12

1 part of the dyestuff described in Example 1 is mixed with 99 parts of high-pressure polyethylene and this mixture is then rolled to and fro on a roller mill for 10 minutes at 140 to 170° C. There is obtained a red foil possessing excellent fastness to light and excellent fastness to migration. The foil can be granulated and the granules so obtained can be used in injection moulding or in foil blowing.

Example 13

99.51 parts of isotactic polypropylene in the form of chips are "bread-crumbed" in the dry state with 0.5 part of the dry dyestuff described in Example 1. The chips, coated with dry dyestuff powder, are then melted at 180 to 220° C. and expressed through a nozzle. There is obtained a strip of red-colored polypropylene that, after cooling, can be granulated. The granules so obtained can be used in injection moulding.

Example 14

99 parts of polyethylene terephthalate chips are "bread-crumbed" in dry state with the pigment dyestuff used in Example 1 and spun from the melt in the usual manner at about 275° C. There is obtained a red-colored polyester filament whose coloration exhibits good properties of fastness.

Example 15

20 parts of a medium viscous polyester from adipic acid and glycols, containing hydroxyl groups, known by the trade name "Desmophen 2200" into which 1 part of 4,4'-diamino-dianthraquinonyl has been rubbed, and 6.5 parts of a mixture of toluene-2,4-diisocyanate and toluene-2,6-diisocyanate are mixed with 1 part of toluolic solution of 10% strength of 4-amino-azobenzene.

The following are then stirred in: 1.9 parts of a mixture of 1 part of distilled water, 1.5 parts of a polyglycol ether, and 3 parts of a basic catalyst, for example ethylmorpholine.

Reaction sets in spontaneously and yields a red foamed polyurethane product.

Example 16

60 parts of an unsaturated polyester resin obtained from maleic acid and glycols known under the registered trademark Crystic 189 HV, and 40 parts of monostyrene was ground with 1 part of 4,4'-diamino-dianthraquinonyl. There were then added 4 parts of a solution of 10% strength of cobalt naphthenate and 4 parts of methyl ethyl ketone hydroperoxide of 60% strength in dibutylphthalate. From the resulting mixture a red plate was cast having a thickness of about 3 mm., and the plate was hardened by polymerization for one hour at 100° C.

Example 17

A mixture of 1 part of 4,4'-diamino-1,1'-dianthraquinonyl is added to a solution at 100° C. of 165 parts of polyacrylonitrile in 834 parts of dimethylformamide. The mass is spun from a spinning machine into a precipitating bath of water at 90° C. The red filaments have good fastness properties.

Example 18

A mixture of 1 part of 4,4'-diamino-1,1'-dianthraquinonyl and 199 parts of a copolymer of 60.1% of vinyl chloride and 39.9% of acrylonitrile, and 800 parts of acetone is stirred for 4 hours at 50° C. The pigmented solution is spun into a precipitating bath of water. The red filaments are then orientated and heat-set in boiling water. They possess very good fastness properties.

Example 19

1 part of powdered 4,4'-diamino-1,1'dianthraquinonyl is agitated in the cold with 100 parts of a powdered copolymer from 15 parts of vinyl chloride and 85 parts of vinylidene chloride so as to form a homogenous pulverulent mixture. 30 parts of tricresylic phosphate are added to the mixture which is then passed into a calender, the rollers of which are heated to 150° C., and finally pressed at 170° C., cooled and taken out of the press. A red-colored foil is obtained.

Example 20

2 parts of powdered 4,4'-diamino-1,1'-dianthraquinonyl are mixed with 7 parts of a copolymer from 85 parts of vinylchloride and 15 parts of vinylacetate and 5 parts of a ketone resin obtained by self-condensation of cyclohexanone and stirred with a mixture consisting of 43 parts of methyl ethyl ketone and 13 parts of toluene. The so-obtained printing color gives when printed in a photogravure rotary machine on paper red prints having excellent fastness properties.

Example 21

1000 parts of urea-formaldehyde resin loaded with cellulose and 2.5 parts of 4,4'-diamino-1,1'-dianthraquinonyl are grounded for 15 hours in a ball mill. The powder obtained is molded by heatiing under pressure for 3 minutes. A red-colored object is obtained.

Example 22

100 parts of cellulose filler and 0.5 part of 4,4'-diamino-1,1'-dianthraquinonyl are added to 100 parts of phenol-formaldehyde resin in powder form. The mixture is ground in a roller mill for rubber heated to 120° C. until homogenous. The sheets obtained are then crushed and ground in a disc mill. A moulding powder is thus obtained is molded by heating under pressure for 3 pressure.

Example 23

A rubber mixture is prepared from 100 parts of crepe rubber, 1 part of stearic acid, 2.6 parts of sulfur, 5 parts of zinc white, 1 part of mercapto-benzthiazole, 0.2 part of hexamethylenetetramine, 60 parts of calcium carbonate, 10 parts of lithopone, 5 parts of titanium dioxide and 2 parts of 4,4'-diamino-1,1'-dianthraquinonyl. The mixture is vulcanized in a vulcanization press at a gauge pressure of 3 atmospheres. There is obtained a red vulcanizate having very good fastness properties.

Example 24

300 parts of a polycarbonate powder which was obtained by polycondensation of 4,4'-dihydroxy-diphenyl-2,2-propane with phosgene in aqueous sodium hydroxide is homogenously mixed with 10 parts of 4,4'-diamino-1,1'-dianthraquinonyl and used for molding at 220° C. There are obtained red articles having excellent fastness properties.

Example 25

45 parts of an epoxy resin which is obtained by polycondensation of 4,4'-dihydroxydiphenyl-2,2-propane with epichlorhydrin in aqueous sodium hydroxide are dissolved in 6 parts of diacetone alcohol, 15 parts of ethylene glycol, 17 parts of methyl isobutyl ketone and 19 parts of toluene. The so-obtained solution is ground in a rod mill with 10 parts of 4,4'-diamino-dianthraquinonyl and mixed with 50 parts of a solution which is obtained by dissolving 32 parts of the above polycondensation product in 25 parts of butanol and 35 parts of xylene to which 8 parts of diethylene triamine as hardener have been added. The lacquer so obtained is brushed on an aluminum foil. After standing for 24 hours at room temperature a very stable coating is obtained.

Example 26

10 parts of rutile type titanium dioxide, 2 parts of zinc white, 10 parts of chalk, 10 parts of talcum, 0.2 part of sodium hexametaphosphate, 20 parts of a 4 percent aqueous solution of carboxymethyl cellulose, 47.8 parts of a 45 percent aqueous polyvinylacetate, and 20 parts of the pigment dispersion as described in Example 5 are ground in a ball mill. There is obtained a red dispersion coloring material which can be used for fast wall coatings.

Example 27

20 parts of polyvinyl butyral obtained by condensation of polyvinyl alcohol with formaldehyde are dissolved in a mixture of 80 parts of glycolmonomethylether and 20 parts of cyclohexanone. This solution is ground with 2 parts of 4,4'-diaminodianthraquinonyl. When applied to an aluminum foil a very tough red coating is obtained.

Example 28

100 parts of a 40 percent solution of methyl methacrylate in butylacetate are ground with 10 parts of 4,4'-diaminodianthraquinonyl. The so-obtained coating composition is suitable as a screening lacquer-enamel.

Example 29

A solution of 20 parts of a polyamide resin obtained by condensation of di- and trimerized unsaturated fatty acids, predominantly linolic acid with polyamines (Versamid 930) in 40 parts of isopropanol and 40 parts n-heptane was ground with 5 parts of 4,4'-diamino-dianthraquinonyl. The so-obtained red printing ink is suitable for intaglio printing on paper, aluminum, cellophane and polyethylene.

Example 30

70 parts of a 30 percent solution of a copolymer of esters of acrylic acid and methacrylic acid in a toluene butanol mixture are mixed with 9 parts of butyl benzylphthalate as plasticizer, 7 parts of ethyl ethylene glycol acetate, 7 parts of methyl ethyl ketone and 7 parts of toluene. The mixture is ground with 5 parts of 4,4'-diamino-1,1'-dianthraquinonyl and 10 parts of titanium dioxide. The so-obtained lacquer gives very fast coatings when sprayed on metals, dried and cured for 1 hour at 80° C.

Example 31

2 parts of powdered 4,4'-diamino-1,1'-dianthraquinonyl is added to 1000 parts of polystyrene in grain form. The mixture is agitated for an hour in a rotating drum; the dyestuff sticks to the grains of polystyrene. An extruder heated to 140–155° C. is fed continuously with the treated grains. A red-colored strip is obtained.

What is claimed is:

1. A solid polymeric material in which there is incorporated 4,4'-diamino-1,1'-dianthraquinonyl in finely divided form.
2. Cellulose acetate in which there is incorporated 4,4'-diamino-1,1'-dianthraquinonyl in finely divided form with an average particle diameter not exceeding 3 microns.
3. Cellulose in which there is incorporated 4,4'-diamino-1,1'-dianthraquinonyl in finely divided form with an average particle diameter not exceeding 3 microns.
4. A polyolefine in which there is incorporated 4,4'-diamino-1,1'-dianthraquinonyl in finely divided form with an average particle diameter not exceeding 3 microns.
5. A vinyl polymer in which there is incorporated 4,4'-diamino-1,1'-dianthraquinonyl in finely divided form with an average particle diameter not exceeding 3 microns.
6. Polyvinyl chloride in which there is incorporated 4,4'-diamino-1,1'-dianthraquinonyl in finely divided form with an average particle diameter not exceeding 3 microns.
7. Polyethylene in which there is incorporated 4,4'-diamino-1,1'-dianthraquinonyl in finely divided form with an average particle diameter not exceeding 3 microns.
8. An alkyd-melamine lacquer in which there is incorporated 4,4'-diamino-1,1'-dianthraquinonyl in finely divided form with an average particle diameter not exceeding 3 microns.
9. A nitrocellulose lacquer in which there is incorporated 4,4'-diamino-1,1'-dianthraquinonyl in finely divided form with an average particle diameter not exceeding 3 microns.
10. An aminoplast resin in which there is incorporated 4,4'-diamino-1,1'-dianthraquinonyl in finely divided form with an average particle diameter not exceeding 3 microns.
11. A urea-formaldehyde resin in which there is incorporated 4,4'-diamino-1,1'-dianthraquinonyl in finely divided form with an average particle diameter not exceeding 3 microns.
12. A melamine-formaldehyde resin in which there is incorporated 4,4'-diamino-1,1'-dianthraquinonyl in finely divided form with an average particle diameter not exceeding 3 microns.
13. An acrylic lacquer in which there is incorporated 4,4'-diamino-1,1'-dianthraquinonyl in finely divided form with an average particle diameter not exceeding 3 microns.
14. A process for coloring a solid polymeric material which comprises incorporating therein 4,4'-diamino-1,1'-dianthraquinonyl in finely divided form.
15. A process for coloring polyvinyl chloride which comprises incorporating therein 4,4'-diamino-1,1'-dianthraquinonyl in finely divided form.
16. A process for coloring a vinyl polymer which comprises incorporating therein 4,4'-diamino-1,1'-dianthraquinonyl in finely divided form with an average particle diameter of at most 3 microns.

References Cited by the Examiner
UNITED STATES PATENTS

| | | | |
|---|---|---|---|
| 1,834,876 | 12/1931 | Smith et al. | 260—367 |
| 1,878,966 | 9/1932 | Mieg et al. | 260—367 |
| 2,346,957 | 4/1944 | Wuertz | 106—193 |
| 2,927,035 | 3/1960 | Wegman et al. | 106—165 |
| 2,929,731 | 3/1960 | De Vries | 106—165 |
| 3,003,989 | 10/1961 | Ehrhardt et al. | 106—288 |

ALEXANDER H. BRODMERKEL, *Primary Examiner.*

J. E. CALLAGHAN, L. HAYES, *Assistant Examiners.*